United States Patent
Zhang et al.

(10) Patent No.: US 8,653,462 B2
(45) Date of Patent: Feb. 18, 2014

(54) METHODS AND SYSTEMS FOR DETECTING TERAHERTZ RADIATION BY RADIATION ENHANCED EMISSION OF FLUORESCENCE

(75) Inventors: Xi-Cheng Zhang, Melrose, NY (US); Jingle Liu, Troy, NY (US)

(73) Assignee: Rensselaer Polytechnic Institute, Troy, NY (US)

(*) Notice: Subject to any disclaimer, the term of this patent is extended or adjusted under 35 U.S.C. 154(b) by 131 days.

(21) Appl. No.: 13/095,267

(22) Filed: Apr. 27, 2011

(65) Prior Publication Data
US 2011/0272584 A1    Nov. 10, 2011

Related U.S. Application Data

(60) Provisional application No. 61/328,475, filed on Apr. 27, 2010.

(51) Int. Cl.
*G01J 5/02* (2006.01)

(52) U.S. Cl.
USPC ........ 250/340; 250/423; 250/423 R; 250/489; 250/423 F

(58) Field of Classification Search
USPC ....... 250/340, 341.1–341.8, 423, 423 R, 489, 250/423 F, 336.1
See application file for complete search history.

(56) References Cited

U.S. PATENT DOCUMENTS

| | | | | |
|---|---|---|---|---|
| 4,517,458 A * | 5/1985 | Barringer | | 250/253 |
| 5,294,796 A * | 3/1994 | Fee | | 250/338.5 |
| 5,373,160 A * | 12/1994 | Taylor | | 250/338.5 |
| 7,215,491 B2 * | 5/2007 | Ueno et al. | | 359/739 |
| 7,531,802 B2 * | 5/2009 | Zhang et al. | | 250/341.1 |
| 7,595,491 B2 | 9/2009 | Zhang et al. | | |
| 7,652,253 B2 | 1/2010 | Zhang et al. | | |
| 7,808,636 B2 | 10/2010 | Schulkin et al. | | |
| 8,164,074 B2 * | 4/2012 | Boyden et al. | | 250/492.1 |
| 2008/0180655 A1 * | 7/2008 | Bruch et al. | | 356/73 |
| 2008/0245964 A1 * | 10/2008 | Miles et al. | | 250/288 |
| 2010/0277718 A1 * | 11/2010 | Zhang et al. | | 356/51 |

OTHER PUBLICATIONS

Liu, et al., "Terahertz-Radiation-Enhanced Emission of Fluorescence from Gas Plasma," Physical Review Letters, 103, 235002 (2009), Dec. 4, 2009, 4 pages.

Liu, et al., "Broadband terahertz wave remote sensing using coherent manipulation of fluorescence form asymmetric ionized gases," Nature Photonics, DOI: 10.1038/ NPHOTON.2010.165, published online Jul. 11, 2010, 5 pages.

* cited by examiner

*Primary Examiner* — David Porta
*Assistant Examiner* — Taeho Jo
(74) *Attorney, Agent, or Firm* — Heslin Rothenberg Farley & Mesiti P.C.

(57) ABSTRACT

Methods and systems for detecting radiation, particularly, terahertz (THz) radiation, are disclosed. The methods and systems disclosed include directing an optical beam in a volume of gas; ionizing at least a portion of the volume of gas with the optical beam to produce a plasma; and detecting a fluorescence produced from an interaction of a radiation wave with the plasma. The information contained in the characteristics of the detected fluorescence, for example, the amplitude and/or phase are used to characterize the radiation wave. Aspects of the invention may be used for homeland security, medicine, and astronomy, among other fields.

21 Claims, 16 Drawing Sheets

US 8,653,462 B2

METHODS AND SYSTEMS FOR DETECTING TERAHERTZ RADIATION BY RADIATION ENHANCED EMISSION OF FLUORESCENCE

CROSS-REFERENCE TO RELATED APPLICATION

This application claims priority from pending U.S. Provisional Patent Application 61/328,475, filed on Apr. 27, 2010, the disclosure of which is included by reference herein in its entirety.

This application is related to pending U.S. patent application Ser. No. 13/097,866 filed on Apr. 29, 2011, the disclosure of which is included by reference herein in its entirety.

This application is also related to pending PCT Patent Application PCT/US11/34466 filed on Apr. 29, 2011, the disclosure of which is included by reference herein in its entirety.

STATE AND FEDERAL FUNDED RESEARCH

The invention described herein was made with U.S. Government support under Contract Number 2008-ST-061-ED0001 awarded by the Department of Homeland Security (DHS); under Contract Number NSF0923353 awarded by the National Science Foundation (NSF); and under Contract Number HDTRA1-09-1-0040 awarded by the Defense Threat Reduction Agency (DTRA). The U.S. Government has certain rights to this invention.

BACKGROUND OF THE INVENTION

1. Field of the Invention

The present invention generally relates to methods and systems for generating and detecting terahertz radiation. More particularly, the present invention relates to detecting fluorescence created by the interaction of plasma and terahertz radiation.

2. Description of Related Art

The work of Zhang, et al. as exemplified by U.S. Pat. Nos. 7,531,802; 7,595,491; 7,652,253; and 7,808,636, among others, underscores the unique potential for terahertz (THz) wave sensing and detection to provide marked improvements in the detection and analyses of materials, in particular, materials harmful to humans, such as, explosives. As is known in the art, THz electromagnetic radiation lies in the electromagnetic spectrum between infrared radiation waves and microwaves.

Although THz-based detecting techniques continue to excel in spectroscopic studies, such as, in-situ and non-destructive evaluation of materials, the ability to conduct such measurements from a significant remote or "stand-off" distance has remained elusive. This is primarily due to inherent THz absorption by atmospheric water vapor. Various THz detection methods have been introduced; however, methods for true remote coherent detection remain to be developed. Recently, the ability to remotely generate THz using optical wavelengths focused at a distance has shown promise in reducing THz free space interaction by a factor of two. Nonetheless, this does not entirely solve the problem since THz attenuation in air can be as high as 100 decibels/meter. Among various THz detection methods, it has been demonstrated that air may be used as a coherent THz detector, and applying a modulated electric field to the nonlinear optical interaction between a THz pulse and an 800 nm optical pulse can greatly enhance the detected coherent information. However, methods for true remote coherent detection without the need for on-site electrodes or cabling remain to be developed.

Laser-induced plasma continues to gain interest because of its increasing number of scientific and technological applications in photo-ionization, high-harmonic generation, laser-induced breakdown spectroscopy, spark-induced breakdown spectroscopy, and the generation and detection of broadband terahertz (THz) pulses. Since the advent of millijoule, femtosecond pulsed lasers, laser-induced plasma has been employed to study the interaction between light and matter and reveal ultrafast dynamics of solids, liquids, and gases.

While some work has been conducted to send THz waves to a remote distances directly, these methods are limited by the extreme absorption of THz by atmospheric water vapor and therefore cannot be extended beyond a few meters, that is, distances which still make the, for example, hazard under study a potential threat to the operator.

Aspects of the present invention provide methods and systems introducing new tools to the arsenal for remote detection, for example, for biological, physical, and defense-based applications, among others.

SUMMARY OF ASPECTS OF THE INVENTION

Recently developed intensive THz sources were used to investigate plasma inverse-bremsstrahlung heating and electron impact molecular excitation by THz waves. Aspects of the present invention provide unique methods and systems to characterize and/or diagnose real-time plasma dynamics, for example, an in-situ and in a non-destructive fashion. In one aspect, using plasma fluorescence emission, the interaction between a THz pulse and a plasma can be studied by detecting fluorescence from the interaction of the THz pulse and the plasma.

One embodiment of the present invention is a method of detecting radiation, for example, terahertz (THz) radiation, comprising or including: directing an optical beam, for example, a probe beam, in a volume of gas; ionizing at least a portion of the volume of gas with the optical beam to produce a sensor plasma; and detecting a fluorescence produced from an interaction of a radiation wave, for example, THz radiation, with the sensor plasma. Though aspects of the invention may be applied to detecting THz radiation, aspects of the invention may be used to detecting any form of electromagnetic radiation, including, but not limited to, microwaves, infrared light, visible light, ultraviolet light, x-rays (soft and hard), gamma rays, and radio waves. In one aspect, the fluorescence comprises radiation-enhanced fluorescence. In another aspect, the fluorescence comprises ultraviolet, substantially non-visible fluorescence. In another aspect, the fluorescence may be omni-directional and substantially transparent to atmospheric gases. Aspects of the invention may be employed for remote sensing a target, for example, a target at least 10 meters from the source of the optical beam, but may be at least 1 kilometer from the source of the optical beam. The target may be a substance harmful to humans, such as, an explosive, a biological agent, and a chemical agent.

Another embodiment of the invention is a method of detecting a target, for example, an explosive, a biological agent, and a chemical agent, the method comprising or including ionizing a first volume of gas to produce an emitter plasma and emit terahertz radiation directed toward a target by directing an optical beam, for example, a pump beam, in the first volume; ionizing a second volume of gas to produce a sensor plasma by directing an optical beam, for example, a probe beam, in the second volume; and detecting a fluorescence produced from an interaction of an incident terahertz wave and the sensor plasma, the incident terahertz wave produced by an interaction of the terahertz radiation with the target. Again, the fluorescence may be ultraviolet, substantially non-visible fluorescence and the target may be a remote target.

A further embodiment of the invention is a system for detecting radiation, for example, THz radiation, comprising or including: source of an optical beam, for example, an optical probe beam; means for directing the optical beam on a volume of a gas wherein at least a portion of the volume of the gas is ionized and a sensor plasma is produced; and an optical detector for detecting a fluorescence emitted from an interaction of an incident radiation wave and the sensor plasma. In one aspect, the fluorescence may be ultraviolet, substantially non-visible fluorescence or radiation-enhanced fluorescence. In another aspect, ionizing the volume of the gas comprises at least one of single-color pulse excitation and two-color pulse excitation. In one aspect, the detector may be located at a distance of at least 10 meters from the source of the incident radiation wave; in another aspect, the detector may be located at a distance of at least 1 astronomical unit from the source of the incident radiation wave. The volume of gas ionized may be remote from a source of the incident radiation wave, for example, the THz wave, or the volume of gas ionized may be in a vicinity of a source of the incident radiation wave.

Another embodiment of the invention is a system for analyzing a target, the system comprising or including means for directing an optical beam, for example, a pump beam, in a first volume of a gas to ionize at least a portion of the first volume of gas to produce an emitter plasma and at least some terahertz radiation directed toward a target; means for directing an optical beam, for example, an optical probe beam, in a second volume of a gas to ionize at least a portion of the second volume of the gas to produce a sensor plasma; and a detector for detecting a florescence emitted from the sensor plasma as a result of an interaction of at least a portion the sensor plasma with a terahertz wave, the terahertz wave comprising terahertz radiation reflected, scattered, or transmitted by the target in response to an incidence of the terahertz radiation directed at the target from the emitter plasma. In one aspect, the detector comprises a photomultiplier tube or a photodiode. The system may further include a spectroscopy signal processing unit for analyzing at least some of the fluorescence. In one another aspect, the first volume and the second volume are substantially spatially separated, for example, wherein substantially none of the first volume and none of the second volume overlap, or wherein no portion of the first volume is within 1 meter of any portion of the second volume or even within 10 meters of the first volume.

Details of these embodiments and aspects of the invention, as well as further aspects of the invention, will become more readily apparent upon review of the following drawings and the accompanying claims.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention will be readily understood from the following detailed description of aspects of the invention taken in conjunction with the accompanying drawings in which:

FIG.

DETAILED DESCRIPTION OF ASPECTS OF THE INVENTION

Figure 1:
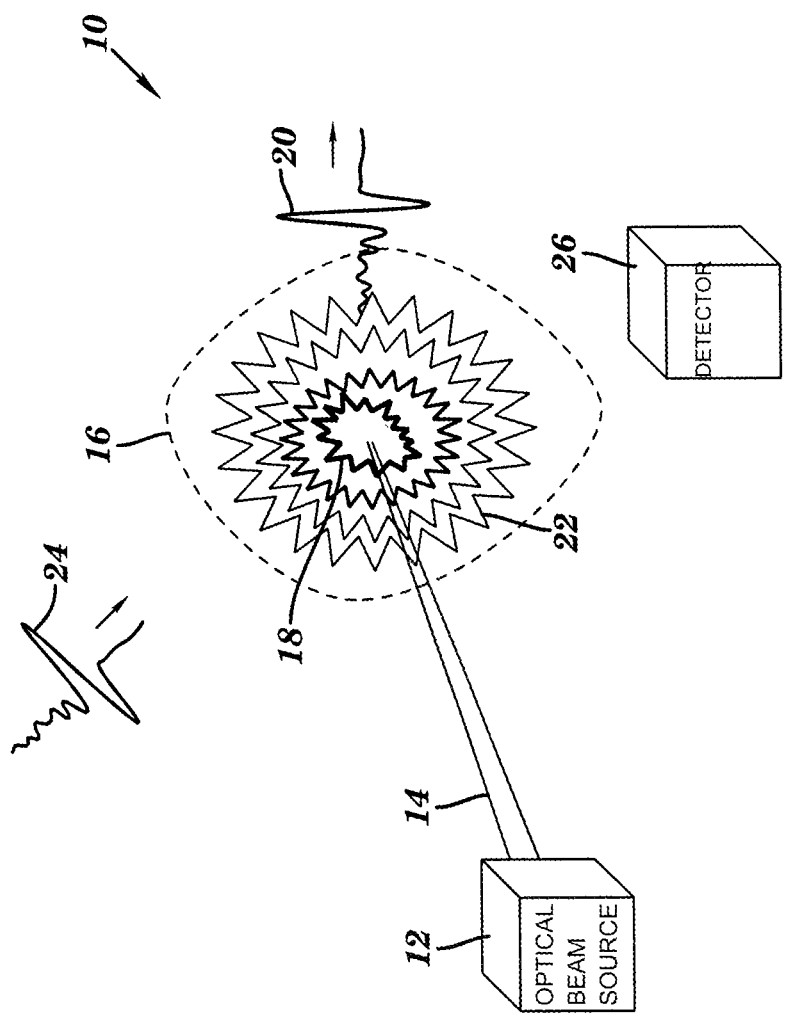
FIG. 1 is a schematic illustration of a system for detecting radiation, for example, THz radiation, according to one aspect of the invention.

The details and scope of the aspects of the present invention can best be understood upon review of the attached figures and their following descriptions. FIG. 1 is a schematic representation of a system 10 for detecting radiation, for example, THz radiation, according to one aspect of the invention. As shown in FIG. 1, system 10 typically includes an optical beam source 12 adapted to produce an optical beam 14, for example, a femtosecond laser beam, and directing optical beam 12 upon a volume of gas 16, typically air. As known in the art, the excitation of the atoms and molecules in gas 16 creates a plasma 18 in at least a portion of the volume of gas 16 and the emission of radiation waves 20, specifically, THz radiation waves. Though typically omni-directional, a representative radiation wave 20 is shown in FIG. 1

As known in the art, under illumination by such an optical beam 14, for example, an intense femtosecond [fs] laser pulse, for instance, a single-color or a multi-color pulse, the molecules in at least a portion of the volume of gas 16 are excited and then ionized by releasing one or more free electrons through multi-photon ionization or tunneling ionization. It is conjectured that after rejection from the atoms or molecules during the leading part of the laser pulse, the electrons are accelerated by the rest of the laser pulse and drift away from their parent ions. In this intense laser field excitation, the electron temperature is usually much higher than the temperature of the neutral particles, for example, mostly molecules in air and ions, having masses that are generally thousands of times larger than electron mass. Before the electron-ion recombination, these "hot" electrons collide with the neighboring "cold" molecules and transfer some portion of their kinetic energy to the molecules through the inelastic electron-molecule collision in the following nanoseconds. The subsequent translational motion of the molecules gives rise to the creation of THz waves 20 and the emission of fluorescence or fluorescence signal 22. Though in one aspect of the invention the emission of emission of THz radiation wave 20 may be useful, in the aspect of the invention shown in FIG. 1, the emission THz radiation wave 20 may be inconsequential.

According to aspects of the invention, optical beam 14 may typically be an intense pulsed laser, for example, a single-color or a multi-color, such, as, dual-color, pulsed laser. According to aspects of the invention, the dual-color aspect of the present invention provides for the detection of both amplitude and phase, that is, coherent detection. In contrast, single-color excitation is typically limited to incoherent detection, for example, where only the amplitude of the radiation wave can be detected.

In the aspect of the invention shown in FIG. 1, the plasma 18 may be used as a means for sensing a radiation wave 24, for example, a THz wave. Specifically, according to aspects of the invention, the presence of a radiation wave 24 varies or "enhances" the fluorescence signal 22 whereby the presence of radiation wave 24 may be detected and/or measured. In one aspect, the fluorescence 22 and any variation in fluorescence 22 may be detected by detector 26, for example, a photomultiplier tube (PMT). Due to the variation or enhancement of the fluorescence 22 by radiation wave 24, aspects of the invention may sometimes be referred to as radiation-enhanced-emission of fluorescence (REEF) or THz-REEF.

In one aspect of the invention, the radiation wave 24 may be a THz radiation wave; however, in other aspects of the invention, radiation wave 24 may be any form of electromagnetic radiation, including, microwaves, infrared light, visible light, ultraviolet light, x-rays (soft and hard), gamma rays, or radio waves. The fluorescence 22 is typically ultraviolet (UV) fluorescence, for example, substantially non-visible UV fluorescence. According to aspects of the invention, fluorescence 22 typically will have a wavelength ranging from about 300 nanometers [nm] to about 800 nm, for example, between about 300 nm an about 400 nm. Though shown directed radially in FIG. 1 for the sake of illustration, fluorescence 22 is typically omni-directional, that is, propagating in three-dimension space about plasma 18. As used here and throughout this disclosure, frequencies of electromagnetic radiation may be specified in nanometers (nm), where the specified frequency corresponds to radiation having about the given wavelength in nanometers. For example, an "800 nm" laser pulse corresponds to a laser pulse having a frequency having a wavelength of about 800 nm.

According to aspects of the invention, there may be a temporal relationship between optical beam 14 and radiation wave 24, for example, the timing of impact of or presence of optical beam 12 upon or in a portion of the volume of gas 16 and the impact of or presence of radiation wave 24 upon or in the portion of the volume of gas 16 may be separated by a time delay $t_D$. Time delay $t_D$ may be positive, negative, or substantially zero, and, according to an aspect of the invention, may be variable or controllable. According to aspects of the invention, a negative time delay, $t_D$, represents a condition in which the plasma generating optical beam 14 leads or preceded the radiation wave 24, that is, optical beam 14 impacts or is present within the portion of the volume of gas 16 before the radiation wave 24. The inventors have found that when the time delay $t_D$ is negative (that is, optical beam pulse 14 precedes the radiation wave 24, for example, a THz pulse), the florescence 22 is observed to be enhanced by the radiation wave field, for example, the THz radiation field.

Figure 2:
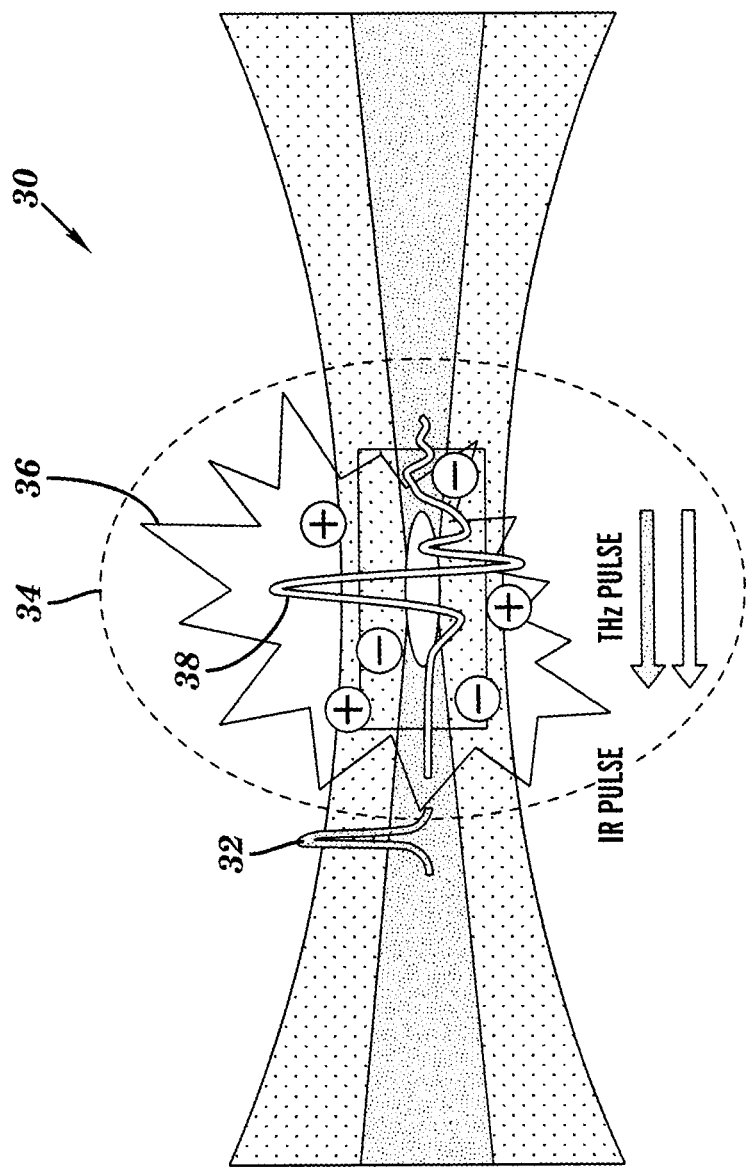
FIG. 2 is a schematic representation of the suspected interaction between a laser pulse a portion of a volume of gas to create a plasma according to an aspect of the invention.

FIG. 2 is a schematic representation 30 of the suspected interaction between a laser pulse 32 with a portion of a volume of gas 34 to create a plasma 36, and the interaction of THz wave 38 and plasma 36. The circled "pluses" and "minus" in FIG. 2 represent the ionized atoms or molecules created in plasma 36.

Figure 3:
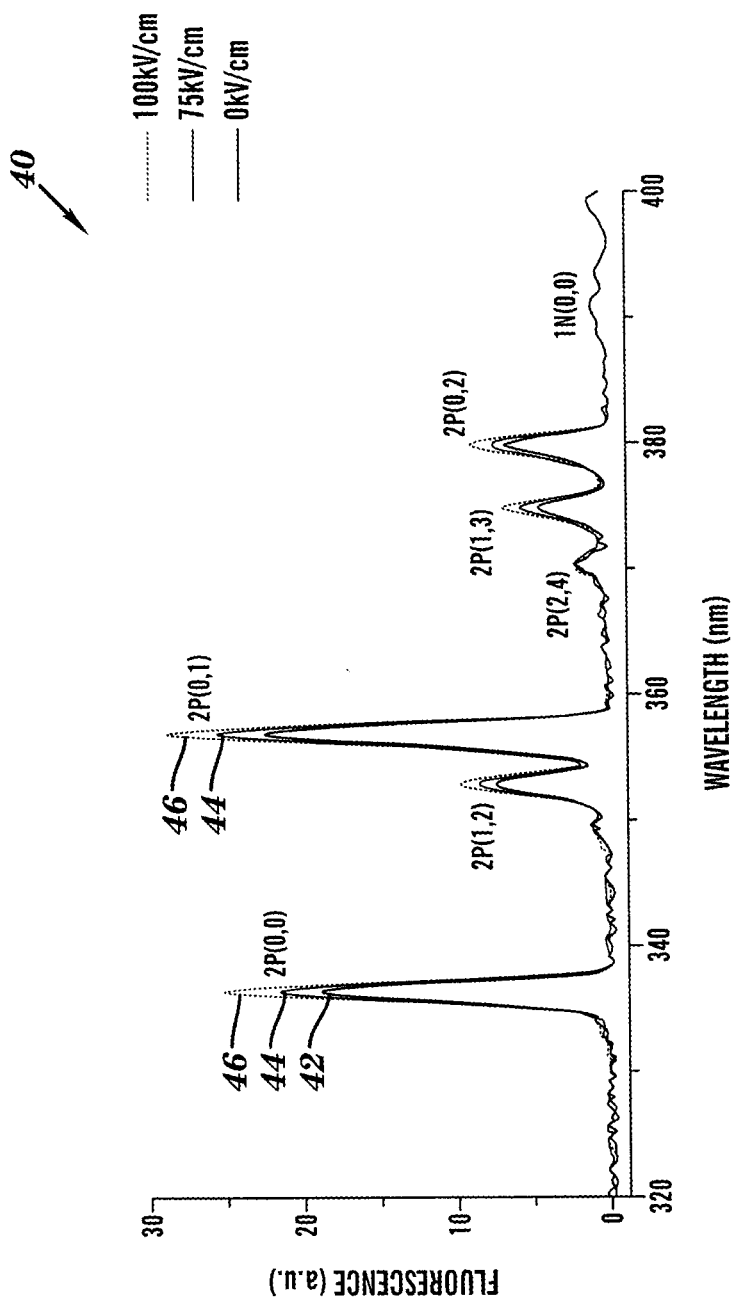
FIG. 3 is a graphical representation of fluorescence spectra detected according to aspects of the invention as a function the intensity of the THz field.

FIG. 3 is a graphical representation 40 of fluorescence spectra detected according to aspects of the invention as a function the intensity of the THz field. The fluorescence is expressed in arbitrary units (a.u.) as a function of wavelength in nanometers and THZ field intensity in kilovolts per centimeter [kV/cm]. Major fluorescence lines are labeled in FIG. 3.

Figure 4:
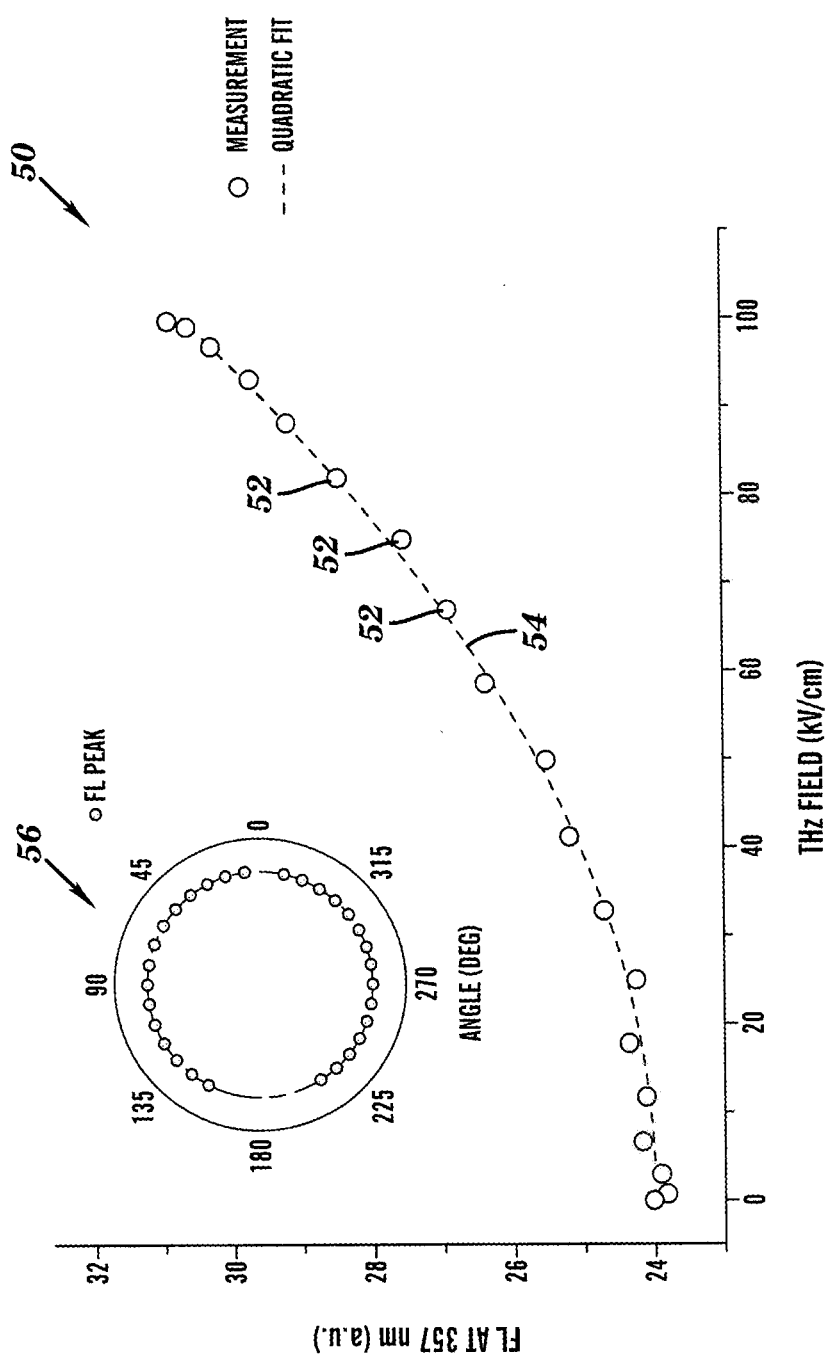
FIG. 4 is a graphical representation of the measured fluoresce emission at a wavelength as a function of the THz field intensity.

As shown in FIG. 3, compared to the fluorescence created when no THz filed is present, as represented by solid curve 42, the fluorescence created when the THz field intensity is 75 kV/cm, red-dashed curve 44, and 100 kV/cm, blue-dashed curve 46, are increased, or "enhanced." For example, the fluorescence is increased at the major fluorescence lines. As shown in FIG. 3, according to one aspect of the invention, the fluorescence may be increased at least about 5%; however, in other aspects, the fluorescence may be increased at least about 10%, or at least about 20%, for example, depending upon the intensity of the THz field. As shown in FIG. 3, the fluorescence may be increased by at least 25%. It is conceived that under appropriate conditions, the fluorescence may be increased at least by 30% or even 40% or higher, for example, at a major fluorescence line FIG. 4 is a graphical representation 50 of the measured fluoresce emission at a wavelength, specifically, 357 nm, as a function of the THz field intensity. As shown in FIG. 4, the measured fluorescence, points 52, and a fit line 54 indicate that the fluorescence emission may typically be a quadratic function of THz field. The inset 56 in FIG. 4 illustrates the typical isotropic, or omni-dimensional emission of fluorescence. Though only a single plane is shown in inset 56, it is to be understood that typically fluorescence is emitted in a 3-dimensional isotropic fashion.

Figure 5:
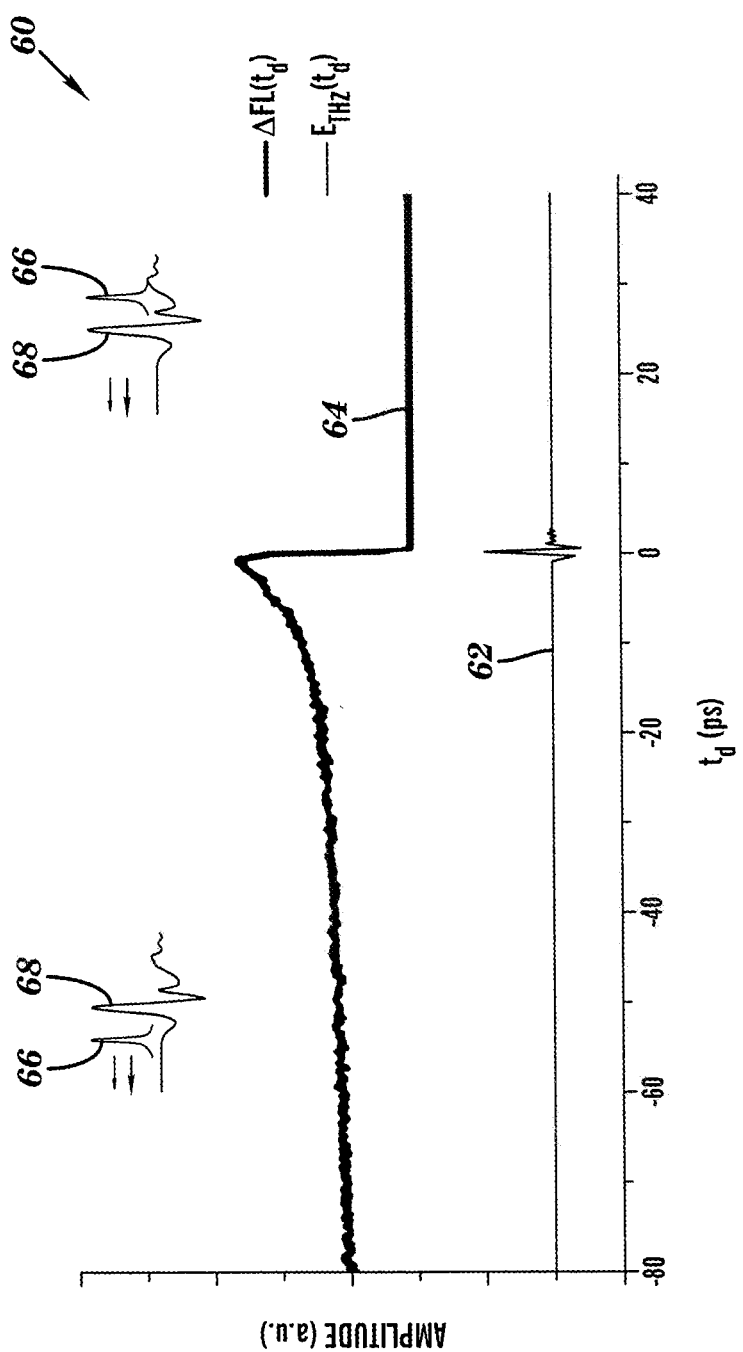
FIG. 5 is a graphical representation of the fluorescence and THz field as a function of time according to one aspect of the invention.

FIG. 5 is a graphical representation 60 of the fluorescence and THz field as a function of time, in particular, of time delay, $t_D$, according to one aspect of the invention. FIG. 5 includes a curve 62 representing the THz field as a function of time delay, $E_{THz}(t_D)$; and a curve 64 representing the enhanced fluorescence field as a function of time delay, $\Delta FL(t_D)$. Curves 62 and 64 in FIG. 4 are normalized and are offset for clarity.

As shown in FIG. 5, until time delay $t_D$ is about zero or negative, that is, when the illumination pulse 66 arrives at the same time or leads the arrival of the radiation wave 68, no enhanced fluorescence occurs. However, when the time delay $t_D$ is zero or negative, the enhanced fluorescence 64 quickly rises to a max and then tapers off with time delay.

Figure 6:
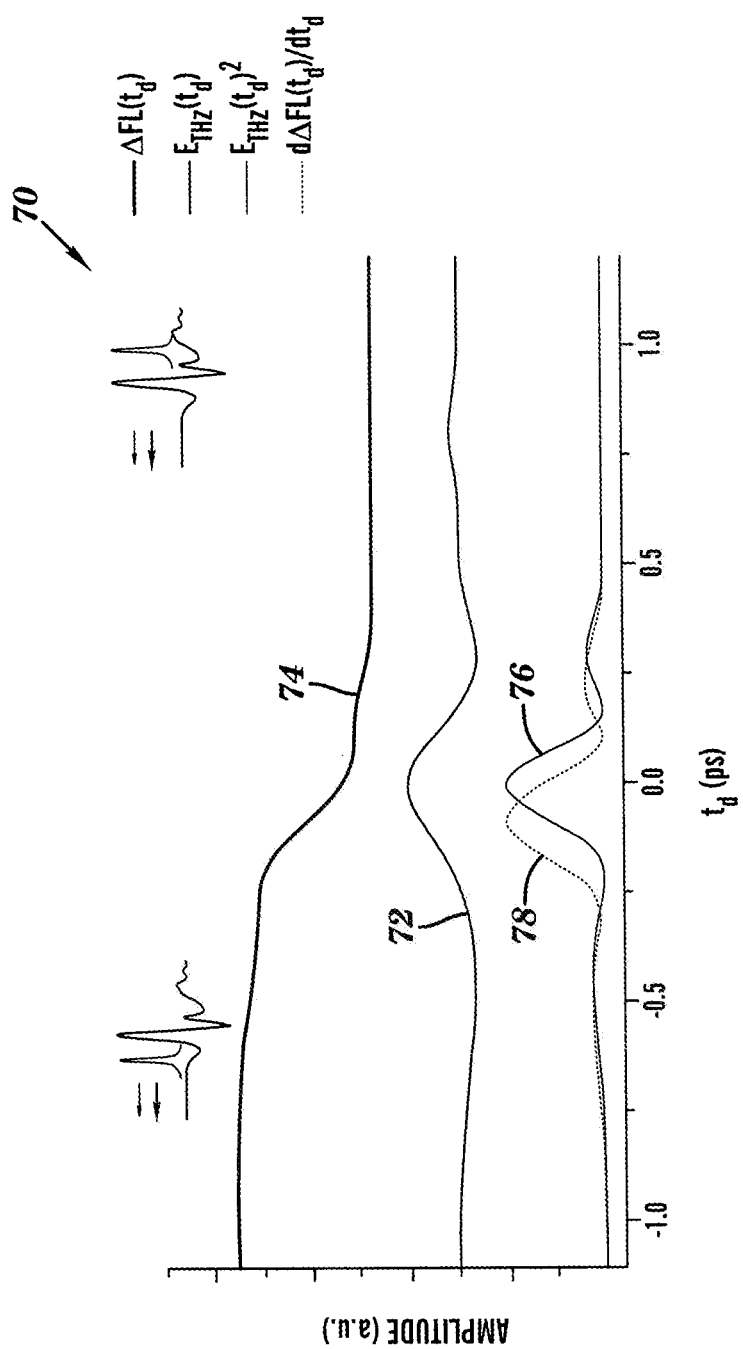
FIG. 6 is a graphical representation of an expansion of the fluorescence and THz field about time delay zero shown in FIG. 5 according to one aspect of the invention FIG. 7 a graphical representation of the vector potential and the change of the vector potential with time of a THz pulse measured by aspects of the invention.

FIG. 6 is a graphical representation 70 of an expansion of the fluorescence and THz field about $t_D$ of zero shown in FIG. 5 according to one aspect of the invention. FIG. 6 also includes a curve 72 representing the THz field as a function of time delay, $E_{THz}(t_D)$; and a curve 74 representing the enhanced fluorescence field as a function of time delay, $\Delta FL(t_D)$; but also includes a curve 76 representing the enhanced fluorescence field as a function of the square of the time delay, $E_{THz}(t_D)^2$; and a curve 78 representing the change in the fluorescence field with time delay, $\Delta FL(t_D)/d(t_D)$. Curves 72, 74, 76, and 78 in FIG. 5 are normalized and offset for clarity.

Figure 7:
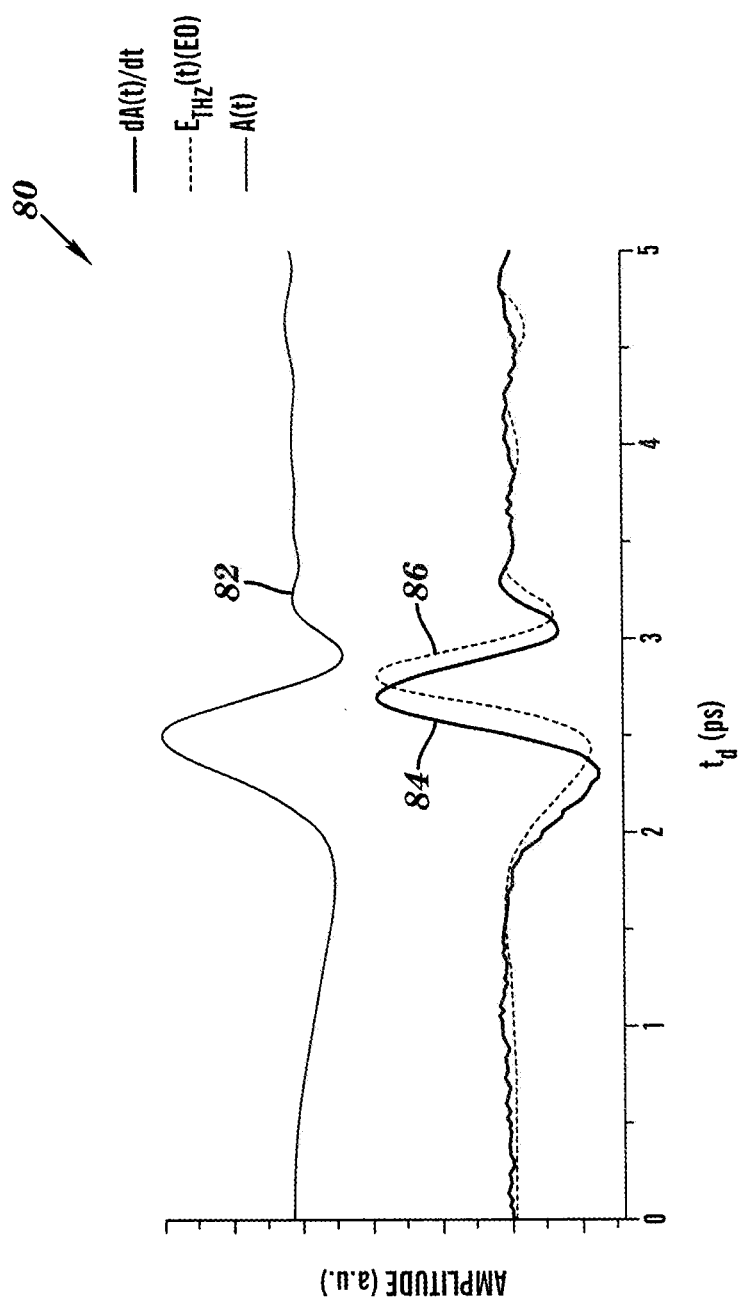

FIG. 7 is a graphical representation 80 of the vector potential and the change of the vector potential with time of a THz pulse measured by aspects of the invention compared with a THz waveform measured by conventional electro-optical EO detection as a function to time delay. FIG. 7 includes a curve 82 the vector potential as a function of time delay, A(t); a curve 84 representing the time rate of change of the vector potential as a function of time delay, dA(t)/dt; a curve 86 representing the THz field detected by EO detection as a function of time delay, $E_{THz}(t)(EO)$.

Figure 8:
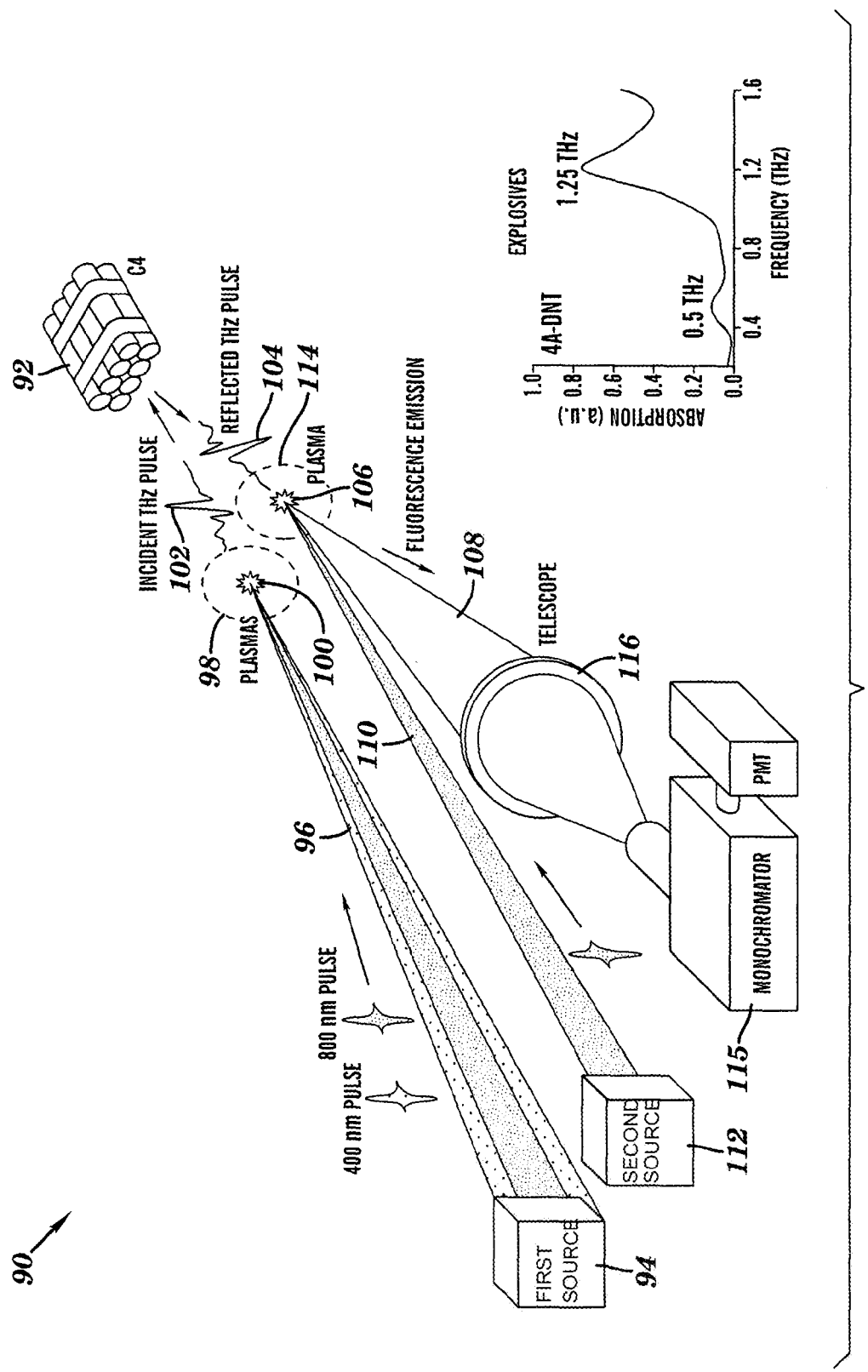
FIG. 8 is a schematic representation of a system adapted to detect fluorescence according to one aspect of the invention.

FIG. 8 is a schematic representation of a system 90 adapted to detect fluorescence variation according to one aspect of the invention. As shown in FIG. 8, system 90 may be used to detect a target 92, for example, a material harmful to humans, such as, an explosive (for example, C4), a biological agent, or a chemical agent. However, in one aspect, target 92 may be any material that may be desired to be detected, for example, an innocuous chemical or substance, for example, to remotely determine the material composition of a substance or structure. System 90 may be a remote or "standoff" system used to detect target 92 from a distance, for example, from one more meters, one or more kilometers, or one or more astronomical units from target 92. According to one aspect, system 90 may includes a source of optical beam 94, for example, a first source, to provide an optical beam 96, for example, a first optical beam, directed toward a volume of gas 98, for example, air. Optical beam 96 may be similar to and have all the attributes of optical beam 14 discussed above. Source 94 may also include means or be adapted to direct or focus optical beam on the volume of gas 98, such as, radiation refracting lenses or radiation deflecting mirrors and the like. As discussed above, optical beam 96 is typically a laser beam or a laser pulse, for example, a femtosecond laser pulse, adapted to ionize at least a portion of volume of gas 98 to generate a plasma 100, for example, a first or "generation plasma," and THz radiation or THz pulse 102. Though THz radiation is typically generated omni-directionally, only the representative THz radiation 102 directed toward target 92 is shown in FIG. 8. As is known in the art, interaction, or reflection of incident THz radiation 102 with target 92 produces a reflected THz radiation or THz pulse 104. As is also known in the art, due to the interaction or reflection of THz radiation 102 with target 92, reflected THz radiation 104 (or radiation incident on plasma 106) contains at least some characteristic indicative of the target 92, for example, at least one characteristic that can be detected from radiation 104 whereby a characteristic or the nature of target 92 can be determined. For example, in one aspect, a characteristic of reflected THz radiation 104 may be compared with documented characteristics of THz radiation reflected or interacting with a library of materials to determine the nature of target 92.

According to an aspect of the present invention, a second or detector plasma 106 may be provided to interact with reflected THz radiation 104 (or radiation incident on plasma 106), and, according to an aspect of the invention, generate fluorescent radiation or fluorescence 108 that can be detected and analyzed to determine at least one characteristic of reflected THz radiation 104 and/or at least one characteristic of target 92. Plasma 106, for example, a detector plasma 106 may be typically be generated by an optical beam 110, for example, a second optical beam, from a second source 112, for example, a second source directed toward a volume of gas 114, for example, air, in the proximity of reflected THz wave 104. Again, optical beam 110 is adapted to ionize at least a portion of the volume of gas 114 to create plasma 106, for example, a detection plasma.

According to aspects of the invention, fluorescence 108 created by the interaction of the reflected THz radiation 104 and the detector plasma 106 may be detected by an appropriate fluorescence detector 115, for example, a monochromator coupled to a photo-multiplier tube (PMT), a spectrometer, or similar device, as shown in FIG. 8. Fluorescence 108 may be directed to or focused on to detector 115 by one or more mirrors and/or one or more lenses, for example, by means of telescope 116. The detected signal can be manipulated, for example, amplified, and/or processed by appropriate receiver/processor operatively connected to microphone detector 115 for example, to produce an output similar to the curves shown in any one or more of FIGS. 3 through 7.

Figure 9:
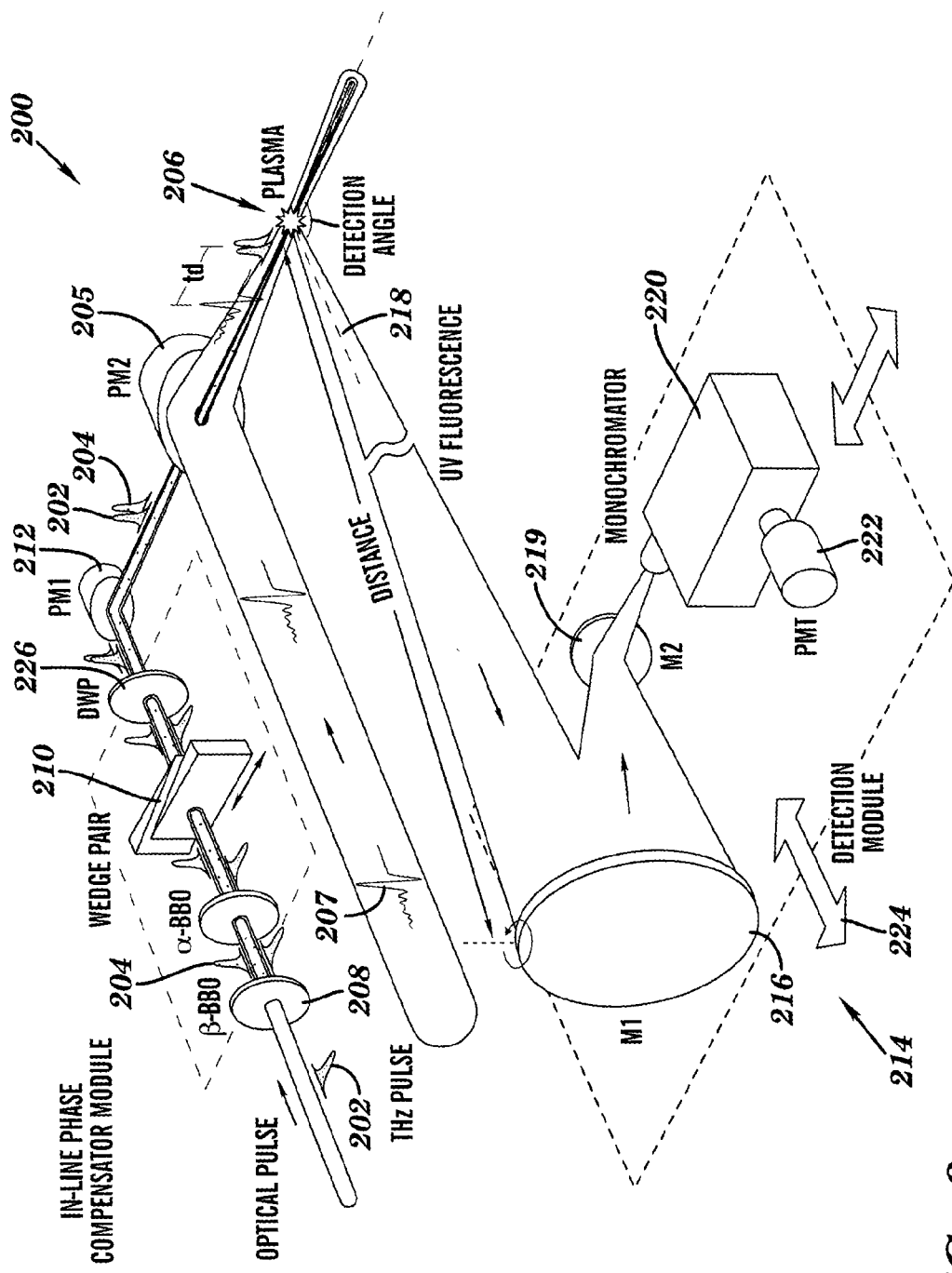
FIG. 9 is schematic illustration of a system employing multi-color plasma excitation according to an aspect of the invention.

Optic beams 96 and 110 in FIG. 8 may be multi-color optic beams, for example, have two or more frequencies, for example, frequencies w and S2 shown in FIG. 9, for example, frequencies of 400 nm and/or 800 nm. However, in one aspect, optic beams 96 and 110 may be single-color or multi-color beams, for example, dual-color beams. For example, in one aspect, optic beam 96 may be dual-color and optic beam 110 may be dual-color. In one aspect, a dual-color beam may comprise a first frequency w and a second frequency S2 may be a harmonic of first frequency w, for example, about half first frequency w. In one aspect, w may be about 800 nm and 106 may be 400 nm. Beams 96 and 110 may comprise pulses of multiple frequencies separated by a time delay and have pulse energies ranging from 50 to 1000 microjoules[µJ], for example, between about 100 and 200 µJ such as, 150 µJ.

In addition, in one aspect of the invention, by employing multi-color optical beams, for example, dual-color beam, to produce a plasma, spectroscopic information may also be encoded into the fluorescence emission. For example, by using dual-color laser excitation to manipulate free electron drift, it is possible to modulate the enhanced fluorescence signal in aspects of the invention and recover a coherent THz time-domain waveform from a plasma. That is, the two-color aspect of the present invention provides for the detection of both amplitude and phase, that is, coherent detection. In contrast, single-color excitation is typically limited to incoherent detection, for example, where only the amplitude of the radiation wave can be detected.

The detection of both the amplitude and the phase of the radiation wave, for example, the THz wave, permits aspects of the invention to be used for spectroscopy, among other applications. Compared to single-color excitation, the performance of multi-color excitation with respect to THz wave detection is one to two orders better due to the larger modulation of the electron momentum and elimination of noise induced by the derivative relation $E_{THz}(t)=dA_{THz}(t)/dt$. Furthermore, aspects of the multi-color embodiment circumvent the limitations of the on-site bias requirement, water vapor attenuation, and signal-collection direction at standoff distances. Moreover, aspects of this embodiment have been effective in detecting broadband terahertz radiation from a distance of a least 10 meters [m]. It is believed that the application of this invention to the field of spectroscopy for use in any field of science and technology is very promising. It is conceived that multi-color optical beams may make it possible to obtain temporal electric field profiles of the radiation waves, for example, THz radiation waves or pulses, by simply detecting the fluorescence from the plasma.

FIG. 9 is a schematic illustration of a system 200 employing multi-color plasma excitation according to one aspect of the invention. As shown in FIG. 9, two-color or dual-color optical laser pulses 202 and 204 having a frequency ω and Ω, for example, Ω may equal 2ω, may be directed, for example, focused, into a gas, such as, air, to produce two-color-excitation plasma 206. The relative phases of the pulses 202, 204 may be controlled by an in-line phase compensator. A single-cycle terahertz pulse 207 with a peak field of about 100 kV per cm may be focused collinearly with the optical beam 202, 204 onto the plasma 206, for example, using mirror 205. The Ω pulse, for example, a second harmonic of pulse ω, may be generated by passing a fundamental beam of frequency w through a crystal 208, for example, a type I β-BBO crystal or its equivalent. Both the fundamental ω, 202 pulse and second harmonic optical Ω, 204 pulse may be linearly polarized along a vertical direction. The relative phase change between the ω, 202 and ,Ω, 204 pulses may be tuned by the lateral translation of fused silica wedges 210 in the optical beam path after the crystal 208, for example, after the α-BBO. The two optical pulses 202 and 204 may then be focused by a parabolic mirror 212, for example, with an effective focal length of 150 mm, into air to generate plasma 206.

As shown in FIG. 9, in one aspect, system 200 may typically include a fluorescence detection system 214, for example, a translatable detection system, which may include a UV concave mirror 216 (M1), for example, having a diameter 200 mm and focal length of 500 mm, a UV plane mirror 219 (M2), a monochromator 220, and a photomultiplier tube (PMT) 222. The distance of remote sensing according to aspects of the invention may be varied by moving the fluorescence detection system or module 214 with respect to the plasma 206 as indicated by arrow 224. A dual wave-plate (DWP) 226 may be positioned between wedges 210 and mirror 212 to rotate pulse 202. As shown in FIG. 9, the time delay $t_D$ is defined as the delay between optical pulse 202, 204 and incident THz pulse 207 peak.

Figure 10:
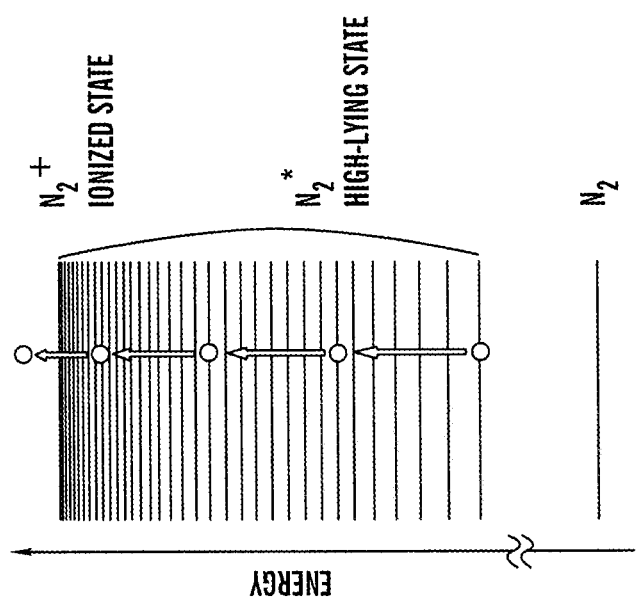
FIG. 10 is a schematic illustration of how the high-lying states can be ionized by a series of collisions with energetic electrons according to aspects of the invention.

According to aspects of the invention, in the laser-induced ionization process, electrons newly released from molecules or atoms typically acquire a constant drift velocity after passage of the laser pulse or pulses. Typically, the drift velocity is determined by the phase of the laser field at the birth or release of the free electrons. Residual current density or asymmetric electron velocity distribution could remain in the plasma, for example, ionized by single-color cycle pulse or by two-color optics field with optimized relative phase. It has been proposed that, under irradiation from intense laser pulses, some of the excited electrons may be trapped in high-lying states of atoms and molecules. It is believed that those trapped states have a large principal quantum number (n>>1) and are more easily ionized by collision with energetic electrons. This ionization is schematically illustrated in FIG. 10. FIG. 10 is a schematic illustration of how the high-lying states can be ionized by a series of collisions with energetic electrons. According to aspects of the invention, it is conjectured that the interaction of laser-induced plasma with a THz wave leads to an increase in plasma temperature through electron acceleration and electron impact produces more ionized gas species and subsequently generates more N2(C3Pp) fluorescence through dissociative recombination. In single-color, multi-cycle laser pulse excitation, which results in a symmetric electron drift velocity distribution, aspect of the invention produce enhanced fluorescence from nitrogen plasma that is quadratically dependent on the THz field. Similar phenomena were also observed in argon, krypton, and xenon gas plasmas.

Figure 11:
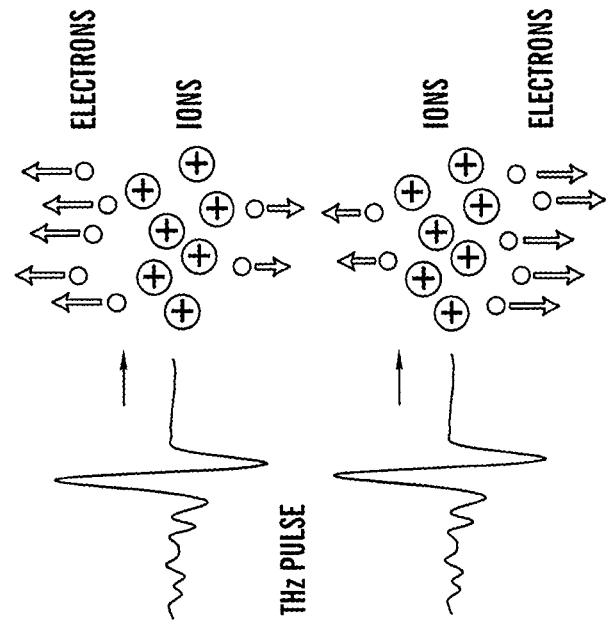
FIG. 11 is a schematic illustration of the interaction between a THz pulse and asymmetric photoelectron velocity distributions generated by two-color field ionization according to an aspect of the invention.

Contrary to the single-color aspects of the invention, in aspects of the invention employing two-color excitation, the synthesized optical field pulses generate ionized electrons with an asymmetric drift velocity. According to an aspect of the invention, the drift velocity distribution and electron trajectories can be regulated or controlled by the polarizations and relative phase of two optical fields, $\phi_{\omega,\Omega}$, for example, by varying the polarization and/or varying the relative phases of the two, or more, optical fields. After the passage of two-color pulses, for example, 202 and 204 in FIG. 9, the electric field of a single-cycle THz pulse 207 applied to the laser-induced plasma 206 alters the ionized electron momentum by acceleration or deceleration, depending on the electron initial velocity v(0), for example, as shown in FIG. 11. FIG. 11 is a schematic illustration of the interaction between the THz pulse and the asymmetric photoelectron velocity distributions generated by two-color field ionization according to an aspect of the invention. According to aspects of the invention, since both the amplitude and direction of the THz field affect plasma fluorescence 218, in FIG. 9, the THz waveform information may be encoded into a change of fluorescence at a different time delay $t_D$ between the THz pulse 207 and the optical pulses 202, 204. According to aspects of the invention, the terahertz waveform 207 can be retrieved by measuring time-dependent fluorescence emission 218, for example, when v(0) is aligned both parallel and antiparallel to THz field, $E_{THz}(t)$.

Figure 12:
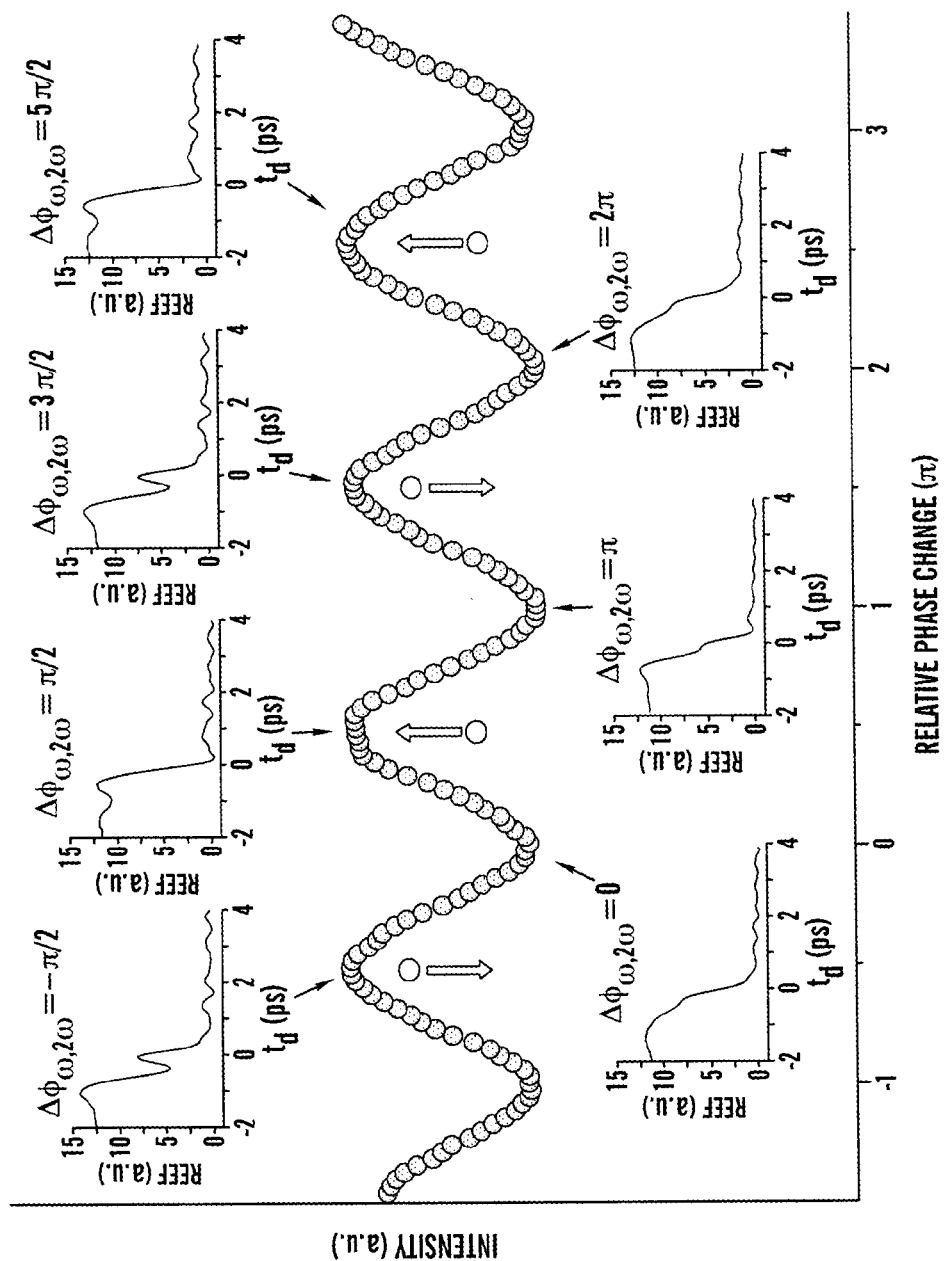
FIG. 12 is graphical representation of the change in fluorescence detectable according to aspects of the invention.
Figure 13:
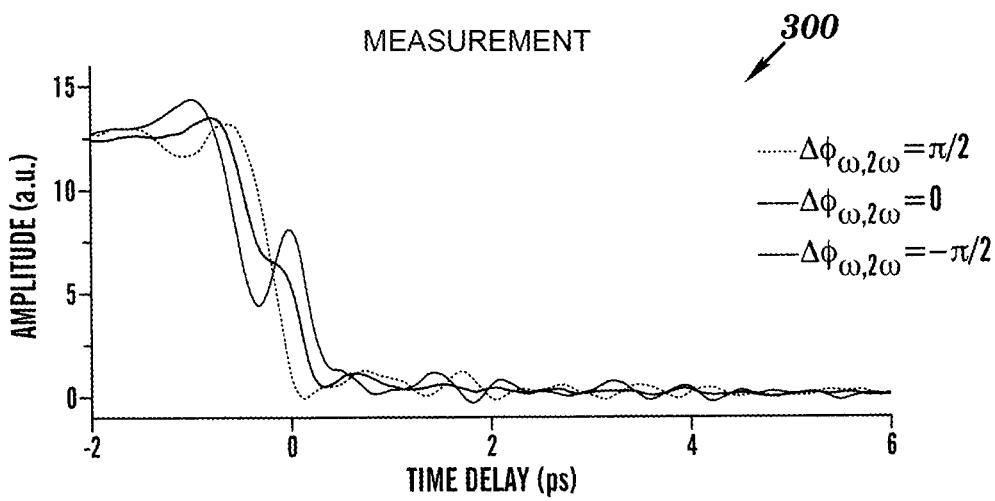
FIG. 13 is a graphical illustration of the variation in fluorescence detectable according to aspects of the invention.
Figure 13:
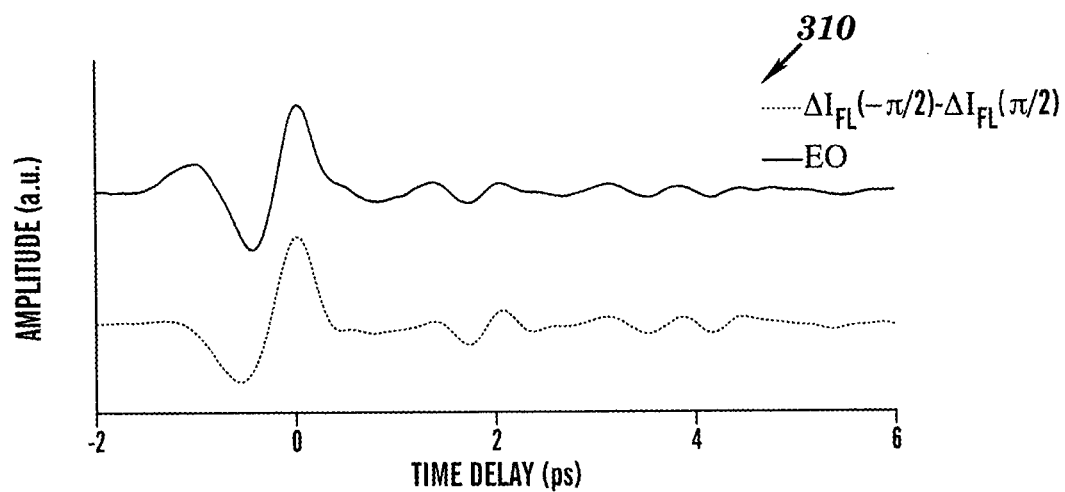
Figure 13:
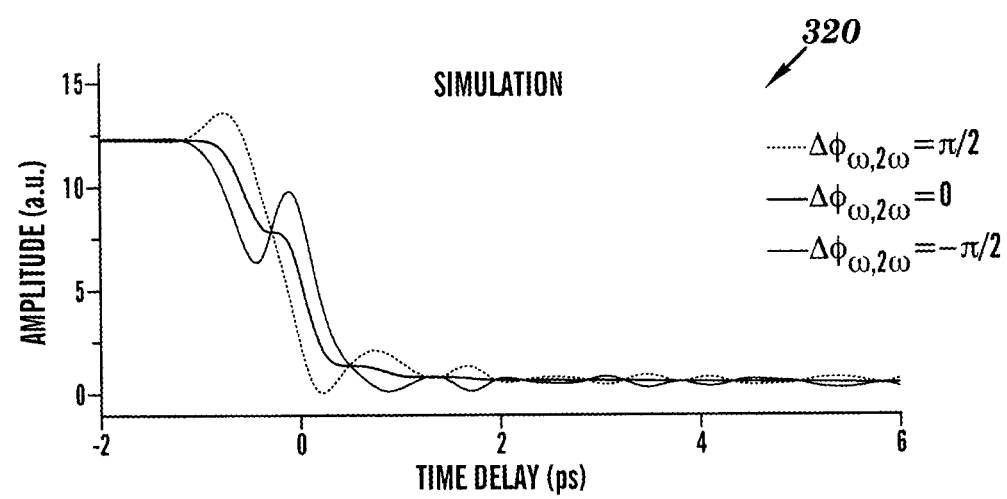

According to aspects of the invention, fluorescence intensities at different $\Delta\phi_{\omega,\Omega}$, for example, $\Delta\phi_{\omega, 2\omega}$, *were recorded as the time delay* $t_D$ between an external THz pulse 207 and the two over-lapping optical pulses 202, 204 was changed. The sliced, individual, time-delay-dependent change in fluorescence according to aspects of the invention, for example, the "THz-REEF" fluorescence $\Delta I_{FL}(t_D, +/-(2l+1)\pi/2)$, for the same external terahertz pulse 207 and optical laser intensity is shown in FIG. 12. FIG. 12 is graphical representation of the change in fluorescence detectable according to aspects of the invention. The upper curves 300 shown in FIG. 13 are a graphical illustration of the variation in fluorescence $\Delta I_{FL}(t)$ according to aspects of the invention. As shown in FIG. 13, curves 300, $\Delta I_{FL}(t_D, \pi/2)$ and $\Delta I_{FL}(t_D, -\pi/2)$ may be substantially symmetric about $\Delta I_{FL}(t_D, 0)$.

According to aspects of the invention, information about the time-dependent THz field, for example, THz field of wave 207 show in FIG. 9, can be directly retrieved by determining the differential between the change in fluorescence $\Delta I_{FL}(t)$ for different optical fields $\Delta\phi_{\omega,\Omega}$, for example, for $\Delta\phi_{\omega,2\omega}$. For example, as shown in FIG. 13, curves 310, the difference in the change in fluorescence at phase difference π/2, that is, $\Delta I_{FL}(\Delta\phi_{\omega,2\omega}=\pi/2)$, and −π/2, that is, $\Delta I_{FL}(\Delta\phi_{\omega,2\omega}=-\pi/2)$ for the two optical pulses is shown. The resulting THz waveform obtained by this differentiation was compared in curves 310 with a THz waveform detected by a 300 μm <110> GaP crystal by electro-optical (EO sampling) for the same THz wave as shown in FIG. 13 curves 310.

Using a semi-classical model, simulated fluorescences at different phases can be calculated for the interaction between a THz pulse. The resulting simulations are shown in curves 320 in FIG. 13 for two-color ionized plasma. As shown, the calculated phase dependence indicated by curves 320 agree well with the measurements shown by curves 300 and 310 detected according to aspects of the invention, and provide a descriptive framework underpinning the primary experimental observations made according to aspects of the invention.

Figure 14:
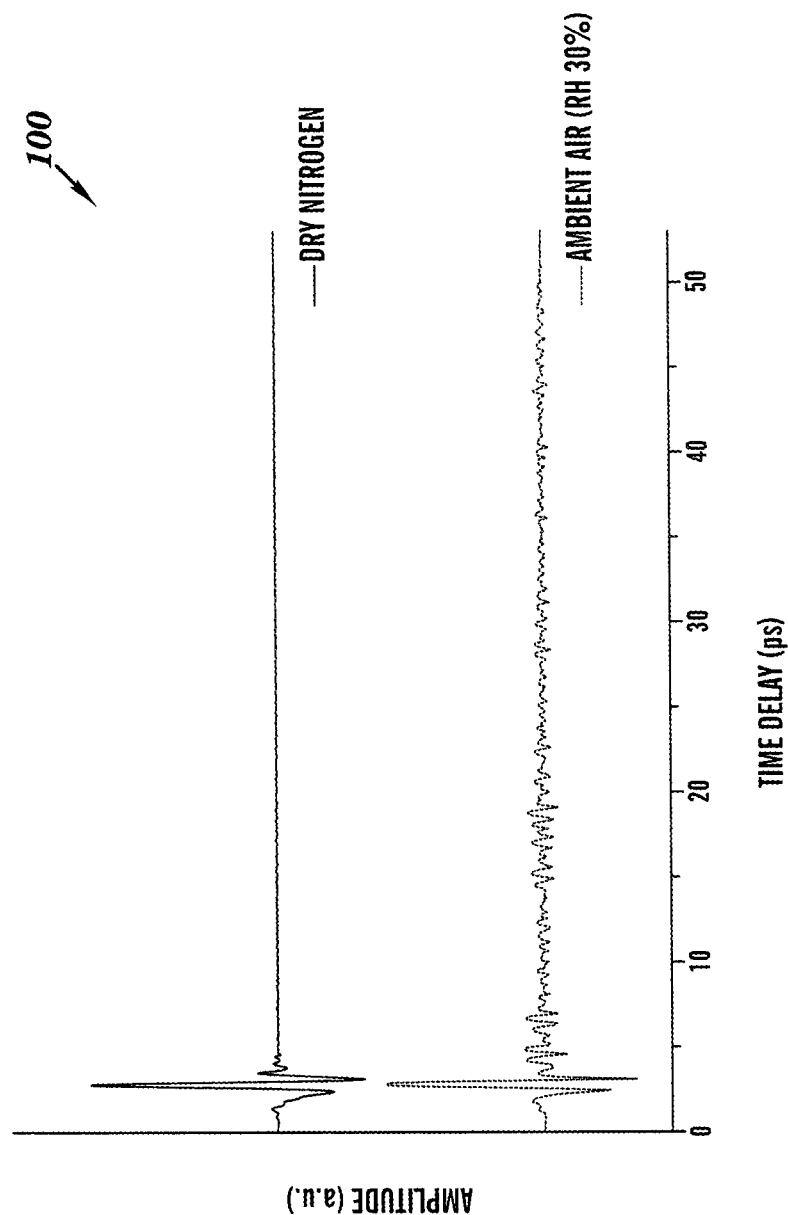
FIG. 14 is a graphical representation of a measured THz wave form detected in dry nitrogen and ambient air as a function of time delay according one aspect of the invention.
Figure 15:
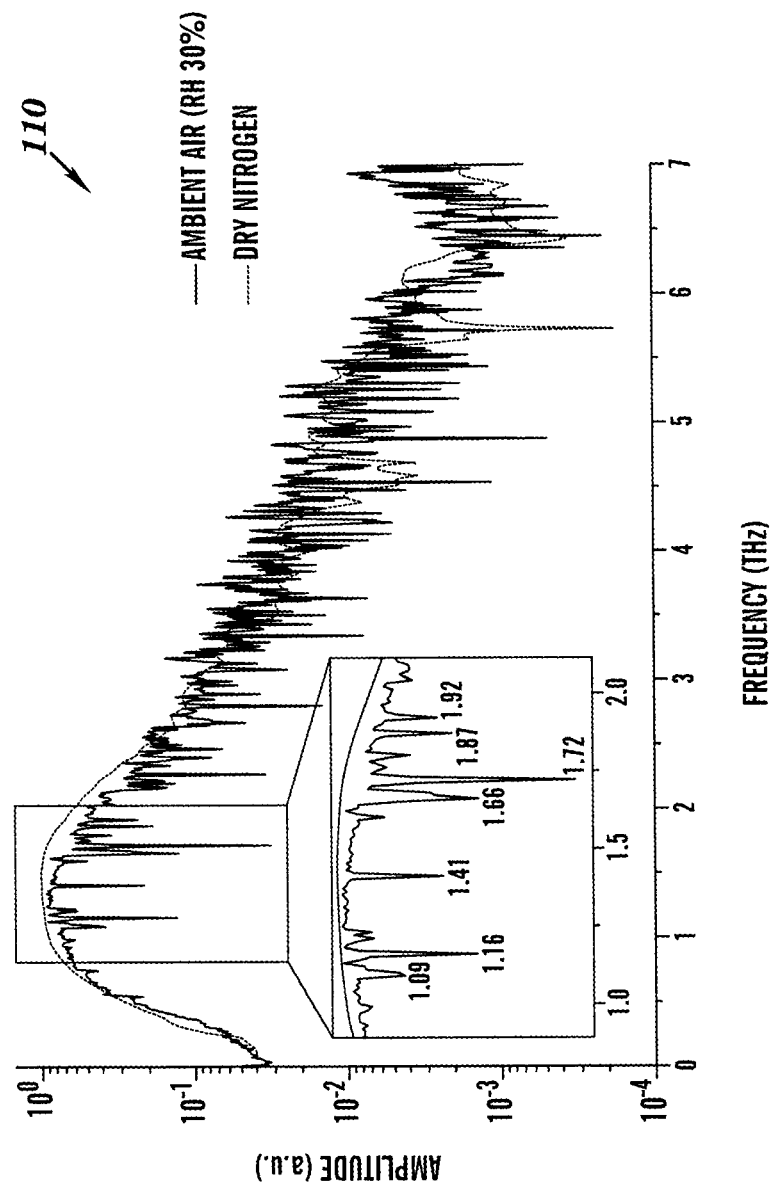
FIG. 15 is a graphical representation of a measured THz wave form of the same analysis performed in FIG. 14, but in the frequency domain.

In order to provide evidence of the effectiveness of aspects of the invention, different molecules were analyzed spectroscopically according to aspects of the invention. For example, FIG. 14 is a graphical representation 100 of a measured THz wave form detected in dry nitrogen and ambient air as a function of time delay according to one aspect of the invention. Understanding intrinsic properties of nitrogen gas, that is, the gas constituting 78% of earth's atmosphere by volume, is essential to many atmospheric laser applications. In this investigation, a focus is placed on the laser-induced nitrogen plasma. FIG. 15 is a graphical representation 110 of a measured THz wave form of the same analysis performed in FIG. 14, but in the frequency domain. As shown in FIGS. 14 and 15, both nitrogen and ambient air can be effectively spectroscopically analyzed according to aspects of the invention. For example, as shown in FIG. 15, the sharp water molecule absorption line that characterizes water can be well resolved.

Figure 16:
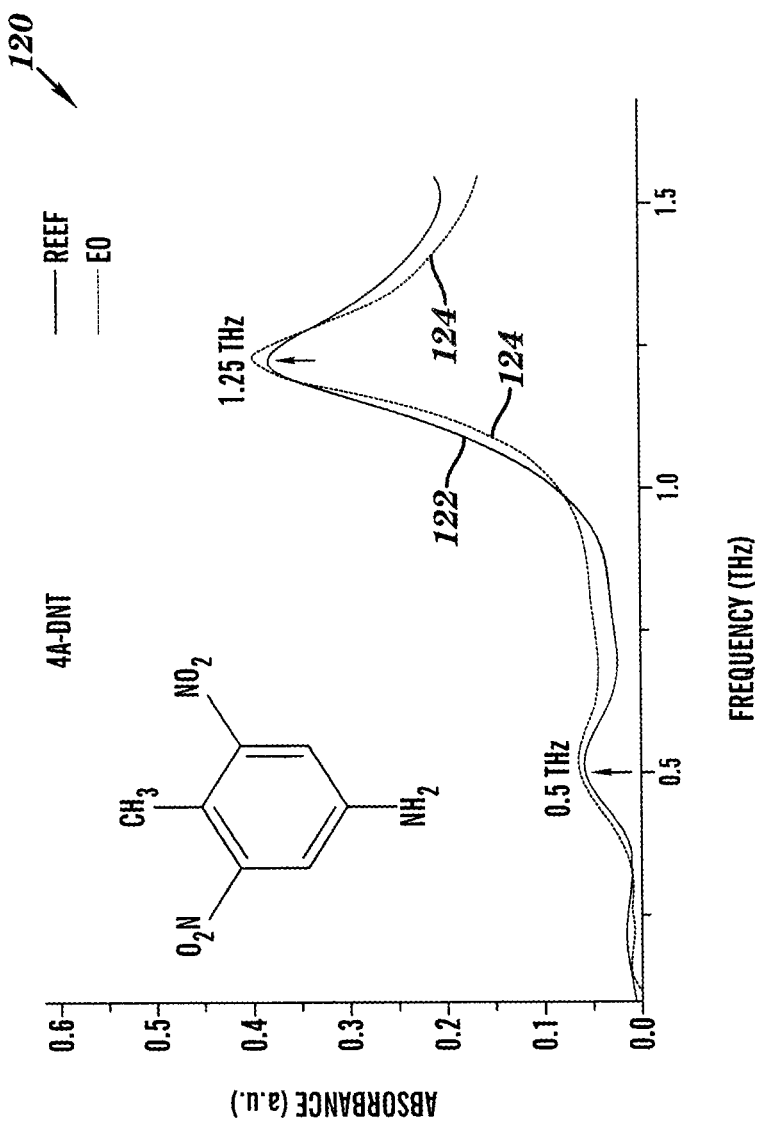
FIG. 16 is a graphical representation of a measured THz wave form detected by fluorescence in the frequency domain according one aspect of the invention.

FIG. 16 provides similar data for the explosive 4A-DNT. FIG. 16 is a graphical representation 120 of a measured THz wave form detected by fluorescence in the frequency domain according to one aspect of the invention. As sown in FIG. 16, the measured wave form 122 according to the invention is found to be identical to the waved form 124 measured by widely-used electro-optical sampling.

Figure 17:
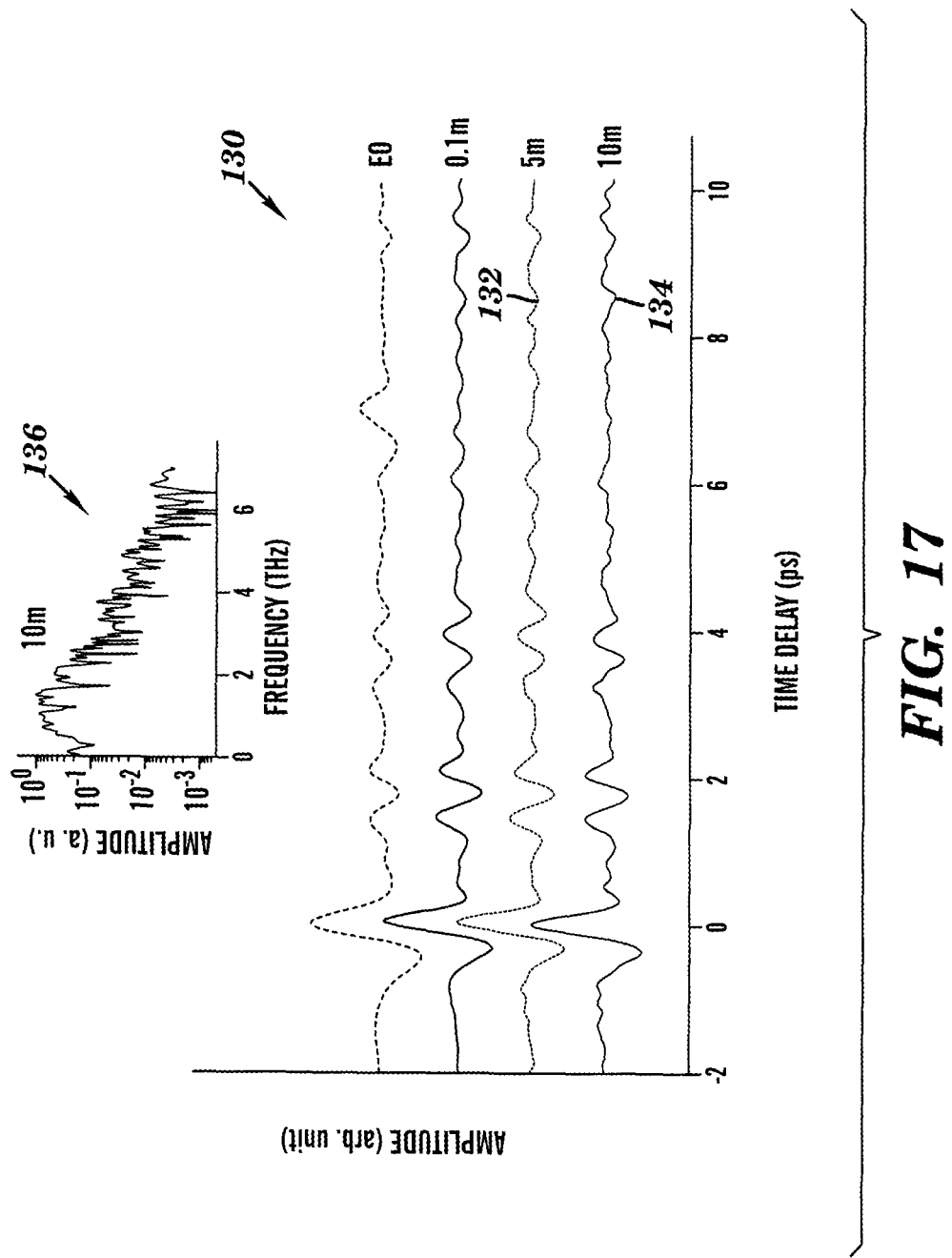
FIG. 17 is a graphical representation of a measured THz wave form detected by fluorescence at varying distance from the plasma as a function of time delay according to aspects of the invention.

FIG. 17 is a graphical representation 130 of a measured THz wave form detected by fluorescence at varying distance from the plasma as a function of time delay according to aspects of the invention. As shown in FIG. 17, testing confirms that aspects of the invention can detect and measure radiation wave, for example, THz waves, at 5 meters (curve 132) and 10 meters (curve 134) from the plasma. The inset 136 in FIG. 17 provides corresponding frequency domain data detected at 10 meters from the plasma.

As indicated by the data in FIG. 17, aspects of the invention are envisioned to provide effective remote radiation wave detection, for example, long range detection, for example, for kilometers, or 10s of kilometers. It is also envisioned that aspects of the invention may be used astronomically, for example, to detect remote radiation astronomical units away from the observer. According to aspects of the invention, one or more lasers, that is, one or more laser filaments, may be projected remotely for kilometers or 10s of kilometers to produce emitter and/or detector plasmas for used in aspects of the invention. Accordingly, aspects of the invention may not only be applied to homeland security, but also to astronomy, environmental monitoring (for example, global environmental monitoring), medicine, biology, and physics.

As described above, aspects of the present invention provide promising solutions for broadband standoff radiation wave sensing, for example, THz wave sensing, and in-situ non-invasive plasma characterization. The fundamental physical nature of femtosecond laser-induced air plasma fluorescence under the illumination of THz pulses is disclosed and described, Semi-classical modeling and experimental verification indicate that time-resolved THz radiation-enhanced-emission-of-fluorescence (REEF) is believed to be dominated by the electron kinetics and electron-impact-excitation of gas molecules/ions. According to aspects of the invention, temporal waveform of a radiation wave field, for example, THz field, can be retrieved from the transient THz radiation-enhanced-fluorescence, making omni-directional, coherent detection available for THz time-domain spectroscopy. The invention could be potentially extended to other spectral regions and is ideal for standoff detection, which has abundant applications in global environmental monitoring, astronomy and homeland security.

Additional aspects and features of the invention are disclosed in the following papers:

Liu, et al., "Terahertz-Radiation-Enhanced Emission of Fluorescence from Gas Plasma," *Physical Review Letters,* 103, 235002 (2009), Dec. 4, 2009, the entire disclosure of which is included by reference herein in its entirety.

Liu, et al., "Broadband terahertz wave remote sensing using coherent manipulation of fluorescence form asymmetric ionized gases," *Nature Photonics*, DOI: 10.1038/NPHOTON.2010.165, published online Jul. 11, 2010, the entire disclosure of which is included by reference herein in its entirety.

As will be appreciated by those skilled in the art, features, characteristics, and/or advantages of the various aspects described herein, may be applied and/or extended to any embodiment (for example, applied and/or extended to any portion thereof).

Although several aspects of the present invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

The invention claimed is:

1. A method of detecting radiation comprising:
   directing an optical beam in a volume of gas;
   ionizing at least a portion of the volume of gas with the optical beam to produce a plasma emitting a fluorescence;
   subjecting the plasma to a radiation wave from a target;
   detecting a temporal radiation enhanced variation in said fluorescence produced from an interaction of the radiation wave with the plasma; and
   retrieving a temporal waveform of the radiation wave from the detected variation.

2. The method as recited in claim 1, wherein the optical beam comprises a femtosecond laser pulse, and the radiation wave comprises at least one of microwaves, terahertz radiation, infrared light, visible light, ultraviolet light, x-rays (soft and hard), gamma rays, and radio waves from the target.

3. The method as recited in claim 1, wherein the radiation wave comprises a terahertz wave, and the fluorescence comprises ultraviolet, substantially non-visible fluorescence.

4. The method as recited in claim 1, wherein ionizing the volume of the gas comprises multi-color pulse excitation.

5. The method as recited in claim 1, wherein the method further comprises characterizing the radiation wave from the detected fluorescence variation.

6. The method as recited in claim 5, wherein the characterizing comprises detecting at least one of an amplitude and a phase of the radiation wave.

7. The method as recited in claims 5, wherein the method further comprises remote sensing of a target based on detecting at least one of an amplitude and a phase of the radiation wave from the target in a terahertz frequency domain.

8. A method of detecting a target, the method comprising:
   ionizing a first volume of gas to produce an emitter plasma and emit terahertz radiation toward a target by directing an optical beam in the first volume;
   ionizing a second volume of gas to produce a sensor plasma by directing an optical beam in the second volume, the second plasma emitting a fluorescence;
   subjecting the sensor plasma to an incident terahertz wave produced by an interaction of the terahertz radiation with the target;

detecting a temporal radiation enhanced variation in said fluorescence produced from an interaction of the incident terahertz wave and the sensor plasma; and retrieving a temporal waveform of the radiation wave from the detected variation.

9. The method as recited in claim 8, wherein the fluorescence comprises ultraviolet, substantially non-visible fluorescence.

10. The method as recite in claims 8, wherein the target comprises a remote target.

11. The method as recite in claim 8, wherein the target comprises a substance harmful to humans.

12. A system for detecting radiation comprising:
a source of an optical beam;
means for directing the optical beam on a volume of a gas wherein at least a portion of the volume of the gas is ionized and a sensor plasma is produced, the sensor plasma emitting a fluorescence;
means for subjecting the subject plasma to an incident radiation wave from a target;
a fluorescence detector for detecting a temporal radiation enhanced variation in said fluorescence resulting from an interaction of the incident radiation wave and the sensor plasma; and
means for retrieving a temporal waveform of the incident radiation wave from the detected variation.

13. The system as recited in claim 12, wherein the source comprises a pulsed femtosecond laser, and the radiation wave comprises at least one of terahertz radiation, infrared light, visible light, ultraviolet light, x-rays (soft and hard), gamma rays, and radio waves.

14. The system as recited in claim 12, wherein the incident radiation wave comprises a terahertz wave, and the fluorescence detector detects variations in ultraviolet, substantially non-visible fluorescence.

15. The system as recited in claim 13, wherein the laser provides two-color pulse excitation ionizing the volume of the gas.

16. The system as recited in claim 12, wherein the system further comprises means for characterizing the radiation wave from the detected variation in the fluorescence.

17. The system as recited in claim 16, wherein the means for characterizing comprises means for detecting at least one of an amplitude and a phase of the radiation wave.

18. The system as recited in claim 12, wherein the detector is located remote to a source of the incident radiation wave.

19. The system as recited in claim 18, wherein the source of the incident radiation comprises a substance harmful to humans.

20. The system as recited in claim 12, wherein the radiation wave comprises a terahertz wave, and the system is adapted for remote detection of a THz wave.

21. The system as recited in claim 12, wherein the fluorescence detector includes a monochromator and a photo-multiplier tube.

* * * * *